United States Patent [19]
Ono et al.

[11] Patent Number: 5,914,193
[45] Date of Patent: Jun. 22, 1999

[54] PHOTOCHROMIC PLASTIC LENS AND ITS METHOD OF MANUFACTURE

[75] Inventors: Ichiro Ono; Kouji Yamazaki, both of Tokyo; Yuko Kawamura, Funabashi, all of Japan

[73] Assignee: Nikon Corporation, Tokyo, Japan

[21] Appl. No.: 08/840,240

[22] Filed: Apr. 11, 1997

[30] Foreign Application Priority Data

| Apr. 12, 1996 | [JP] | Japan | 8-091291 |
| Apr. 15, 1996 | [JP] | Japan | 8-091616 |
| Apr. 19, 1996 | [JP] | Japan | 8-097895 |
| Apr. 24, 1996 | [JP] | Japan | 8-102875 |
| Apr. 25, 1996 | [JP] | Japan | 8-105708 |

[51] Int. Cl.$^6$ ..................... B32B 13/12
[52] U.S. Cl. ............. 428/451; 427/164; 427/255.6; 427/255.7; 427/578; 428/515
[58] Field of Search ............... 427/164, 166, 427/255.6, 255.7, 578; 428/412, 451, 515

[56] References Cited

U.S. PATENT DOCUMENTS

| 5,094,691 | 3/1992 | Watanabe et al. | 106/286.4 |
| 5,496,641 | 3/1996 | Mase et al. | 428/423.1 |
| 5,624,757 | 4/1997 | Smith | 428/412 |
| 5,643,423 | 7/1997 | Kimock et al. | 427/164 X |

*Primary Examiner*—Michael Lusignan
*Attorney, Agent, or Firm*—Morgan, Lewis & Bockius LLP

[57] ABSTRACT

The invention provides a commercially feasible method of manufacturing a photochromic lens on a large scale. The method involves vacuum depositing a photochromic material onto a surface of a plastic lens to form a photchromic depositied lens, and heating the photochromic deposited lens for a time and at a temperature sufficient to allow the photochromic material to permeate the lens.

31 Claims, 4 Drawing Sheets

PHOTOCHROMIC PLASTIC LENS AND ITS METHOD OF MANUFACTURE

These applications claim the benefit of Japanese Application No. 08-091,291 filed Apr. 12, 1996; Application No. 08-091,616 filed Apr. 14, 1996; Application No. 08-097,895 filed Apr. 19, 1996; Application No. 08-105,708 filed Apr. 25, 1996; and Application No. 08-102,875 filed Apr. 24, 1996 and are hereby incorporated by reference.

BACKGROUND OF THE INVENTION

1. Field of the Invention

The present invention relates to a method of manufacturing a plastic lens which contains photochromic material. More particularly, the invention relates to depositing photochromic material on a plastic lens and then heating the lens to permeate the lens with the photochromic material.

2. Background of the Invention

Plastic lenses are widely used as optical lenses, especially as lenses used for eyeglasses due to their ease of shaping, light weight, durability against cracking and ease of coloring. Prior lenses made of plastics were generally worse than lenses made of inorganic glasses in terms of photochromic characteristics such as coloring density, coloring speed, color fading speed and durability in aperture. Conventionally, photochromic characteristics were provided to plastic lenses by the following methods: (1) premixing a powder or a pellet form of plastic lens material with photochromic materials followed by melting and mixing them together; (2) dispersing photochromic material in liquid monomers which are polymerized to form a plastic lens after polymerization; (3) immersing the hardened plastic lens material into a solvent with dispersed photochromic; (4) dissolving and dispersing the photochromic material into a liquid form of corresponding polymers and/or monomers, and solvent containing solutions if necessary, coating the surfaces of various lens materials, such as inorganic glasses and plastics, with the solutions, followed by drying and hardening the coated lens; (5) dissolving and dispersing the photochromic in a corresponding solvent, coating the surface of the plastic lens material with the photochromic solution and then heating the coating to permeate the photochromic into the plastic lens material.

However, the conventional methods listed above are not suitable for forming photochromic plastic lenses. Methods (1) and (2) cannot be applied to manufacturing plastic eyeglass lenses for correcting visual acuity. A photochromic lens formed by method (1) or (2) is hardened with the photochromic evenly dispersed inside. Since the thickness of eyeglass lenses differ from point to point, the resulting density of the photochromic will also vary in proportion to the thickness. Therefore, it is not possible to produce a lens with an even density of photochromic using method (1) or (2). Methods (3) and (5) require solvent to disperse the photochromic. However, it is difficult to use solvents such that the surface of the plastic lens material is not disturbed or degraded. When using method (4), the types of polymers and/or monomers used to coat the surface of the plastic lens materials are limited. Furthermore, method (4) has a disadvantage of low productivity when coloring since coating liquids must be prepared for each color.

When forming lenses other than photochromic lenses, such as tinted lenses, the lens material is first heated. Sublimation dyes are then evaporated near the heated surface of the lens using a resistant heater which deposits the dyes onto the surface of the lens, and permeates the dyes into the lens material. However, such a manufacturing method has a low probability of dye adhering to the lens, and is problematic since most dyes would adhere to a surrounding vacuum chamber, such as a bell chamber. Besides, this method is a slow process since deposition of sublimation dyes onto the plastic lens material and heat permeation of the materials take place in a vacuum. Such a process is not suitable for the manufacture of darker, highly tinted lenses.

In the prior photochromic lens manufacturing methods, only lenses having a color on the entire surface, which degrades over time, could be manufactured. The color then degrades over time. Furthermore, it was difficult to manufacture the photochromic lenses with two or more colors, especially with three or more colors, with existing manufacturing methods.

Due to their nature, photochromic lenses are frequently used outdoors. Therefore, photochromic lenses must be manufactured to withstand various environments. Thus, there is a need to improve durability, such as scratch resistivity, impact resistivity, adhesiveness and pollution resistivity, especially when a region of diffused photochromic is inside the surface of the plastic lens material. There is also a need for improving the light controlling speed which is characteristic of photochromic lenses. The photochromic lenses having these characteristics must be manufactured easily at low cost.

The purpose of the present invention is to answer the above mentioned problems, and to enable the manufacture of photochromic lenses at low cost and with high productivity while producing lenses which are high in durability and photochromic characteristics.

SUMMARY OF THE INVENTION

The invention provides a method of manufacturing a photochromic plastic lens. The method vacuum deposits photochromic material on the surface of a plastic lens to form a photochromic deposited lens. The method then heats the photochromic deposited lens for a time and at a temperature sufficient to allow the photochromic material to permeate the lens. The photochromic lens created by these methods contains a region having a permeated photochromic material inside the lens surface. The plastic lens may be manufactured by a reaction injection molding process with monomers polymerized and cured by irradiation of ultraviolet rays and heat. The photochromic material deposition and heat permeation may be controlled so as to form a photochromic gradient inside the lens. The photochromic lens may contain a number of surface regions which are coated with different photochromic materials and/or different amounts of photochromic materials. In a further embodiment the heating of the photochromic material occurs at, near or below ambient pressure.

A photochromic lens of the invention may also contain various layers such as a primer layer, a hard coating layer, a water resistance layer, an antiglare layer and a refraction gradient layer. Within a refraction gradient layer, the index of refraction may be allowed to vary within the layer. In a preferred embodiment, a refraction gradient layer is deposited by a chemical vapor deposition (CVD) process. The refraction gradient layer may be formed above a hard coating layer. The hard coating layer may be formed by a chemical vapor growth method using plasma and a Si containing organic compound gas and/or a Ti containing organic compound gas. Within the hard coating layer the index of refraction may be constant. The hard coating layer may be thinner than the refraction gradient layer.

The photochromic lens may also contain a primer layer. A primer layer may be coated onto the plastic lens prior to vacuum deposition of the photochromic material in order to enhance the permeation of the photochromic material into the lens. Alternatively, a primer layer may be formed on the photochromic permeated plastic lens in order to improve impact resistivity. The impact resistivity primer layer may be formed by coating a compound such as a urethane based resin or crosslinked polyvinyl acetal resin over the photochromic lens.

materials capable of being applied in the present invention, for example, are the spiropyran group and the spirooxazine group with the color structure described below by (Ia) and (Ib).

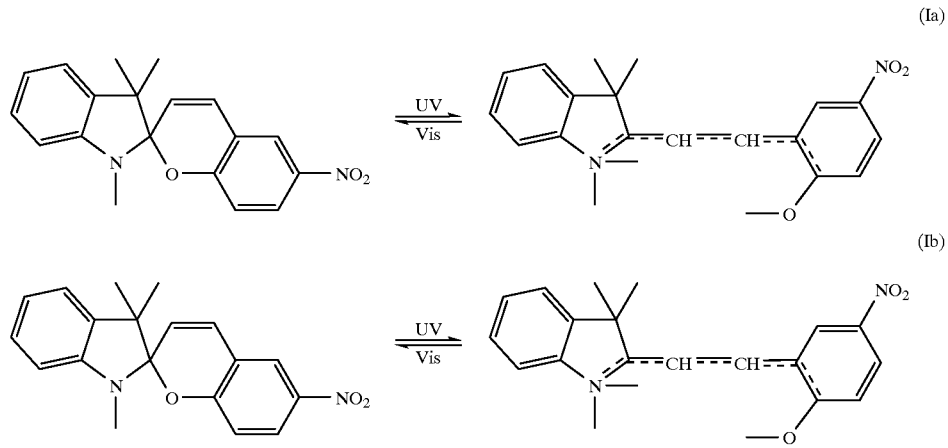

(Ia)

(Ib)

DETAILED DESCRIPTION OF THE PREFERRED EMBODIMENTS

Figure 1A:
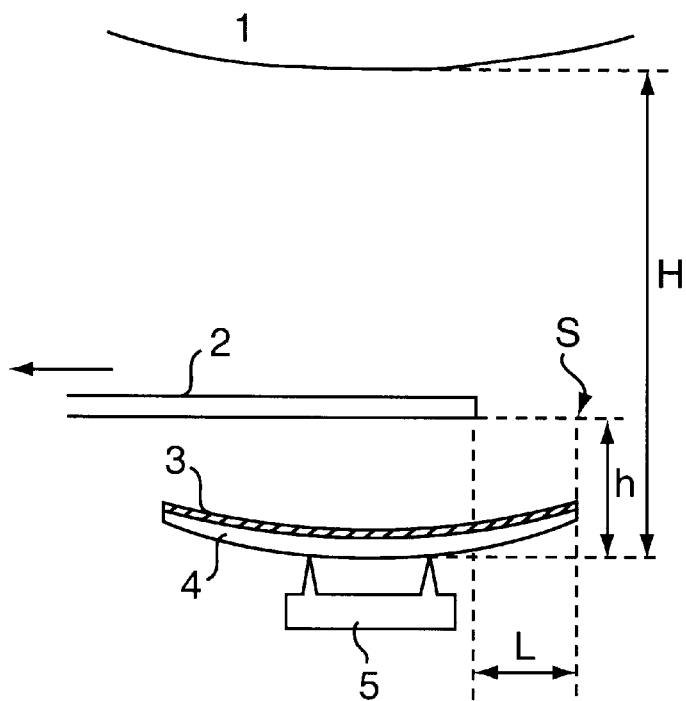
FIG. 1 is a schematic diagram of the equipment for manufacturing photochromic plastic lenses with gradation, illustrating an embodiment of the invention.

The invention provides a commercially feasible method of manufacturing a photochromic lens on a large commercial scale. The method involves vacuum depositing a photochromic material onto a surface of a plastic lens to form a photochromic deposited lens. The method then heats the photochromic deposited lens for a time and at a temperature sufficient to allow the photochromic material to permeate the lens.

The photochromic materials suitable for use in the invention are materials conventionally used and understood in the prior art for making photochromic lenses. Photochromic materials used generally include compounds from the chromene group, the spirooxazine group, the spironaphthooxazine group, the spiropyran group, the naphthopyran group, succinic anhydride groups such as 2-(1-(2,5-dimethyl-3-furyl) ethylidene)-3 isopropylidene succinic anhydride, succinimide groups such as 2-(1-(2,5-dimethyl-3-furyl) ethylidene)-3 isopropylidene succinimide, viologen, the triallylmethane group, the diallylethane group, and the diazo group.

The photochromic material, in practical application, includes various isomers or derivatives whose backbone structures are somewhat different. Specific photochromic For example, chemical formulas (IIa–c) described below are examples of suitable photochromic material spirooxazine group derivatives:

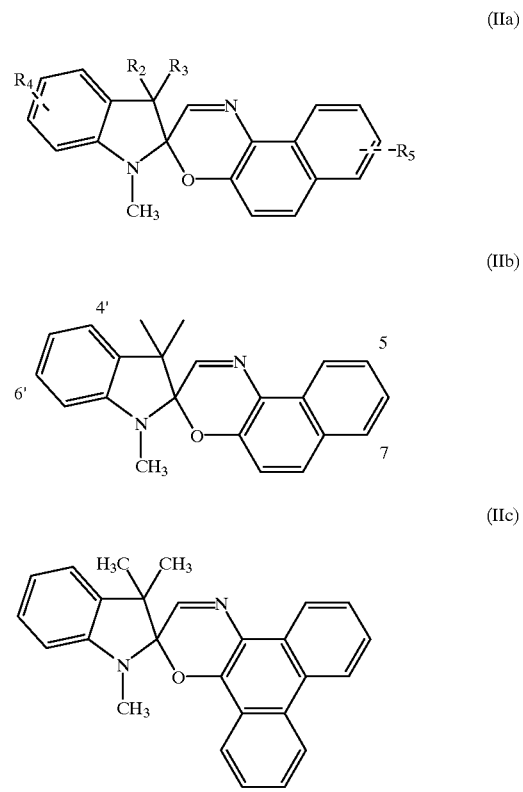

(IIa)

(IIb)

(IIc)

wherein $R_2$ and $R_3$ are independently $CH_3$ or $C_2H_5$, $R_4$ is Cl, OH, $OCH_3$, $CH_3$ or $C_2H_5$ and $R_5$ is N, $OCH_3$, $C_6H_5$, OH, $CH_3$, CN and $CF_3$.

Chemical formulas (IIIa–b) describe various succinic acid anhydride and succinimide groups:
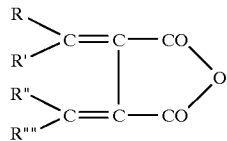
(IIIa)
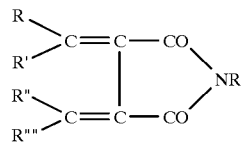
(IIIb)
wherein for (IIIa) R and R'' are $C_6H_5$ and R' and R'''' are H or wherein R, R' and R'' are $C_6H_5$ and R'''' are H and for (IIIb) R', R'', R''' are same as (IIIa) and R is $C_6H_5$ or H.
Chemical formulas (IVa–e) are sample descriptions of chromene group materials.
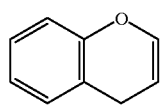
(IVa)
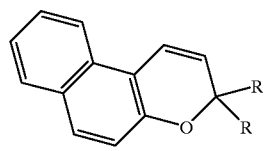
(IVb)
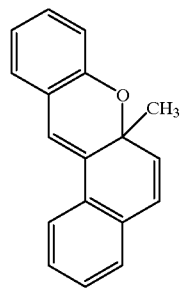
(IVc)
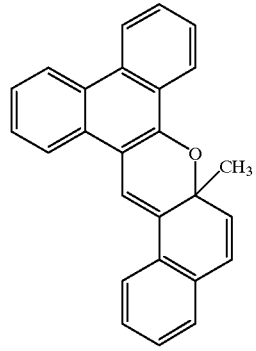
(IVd)
(IVe)

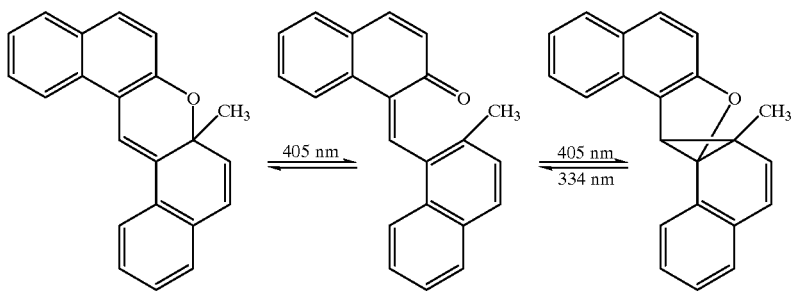

wherein R in formula (IVb) is $C_6H_5$ or H.

Various derivatives of naphthopyran group described in Chemical formula (V) are also examples of photochromic materials suitable for use in for the invention.

(V)

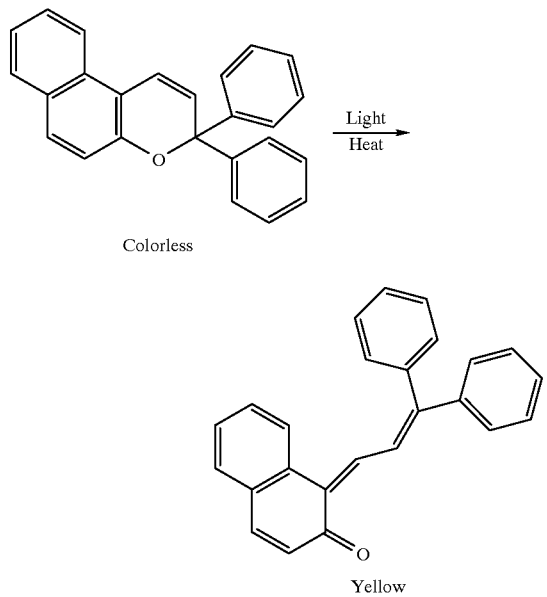

Vacuum deposition of the photochromic material onto the surface of a plastic lens is accomplished by evaporating a photochromic material under high vacuum and condensing it on the surface of the lens. The standard vacuum level used for the vacuum deposition of the photochromic is equal to or less than $5 \times 10^{-5}$ torr. Vacuum deposition takes place with heat from a heater and with the photochromic being placed inside a crucible. The heating temperature of the photochromic material in this invention is generally between 100–200° C. As for the vacuum deposition step, any well known standard vacuum deposition method can be used. For example, a method heats, generally by resistant heating, the photochromic material in a vacuum, and deposits it onto the surface of the plastic lens material. A method of the invention then heats the plastic lens with the photochromic material deposited by the vacuum deposition method. With this method, a plastic lens which contains permeated photochromic material inside the surface of the plastic lens, and possesses desired photochromic characteristics, can be manufactured.

Heating a plastic lens with photochromic material deposited on its surface can be conducted under standard pressure with normal air or non-reactive gas. However, a reduced pressure environment may also be used. The heating step may preferably be conducted at 100–200° C. for 0.5 hours. Any conventional heating means can be used to heat permeate the photochromic material. Typical heating means include, but are not limited to, electromagnetic waves, heated air, water, oil and far infrared.

Heating the lens under standard pressure is very advantageous. By heating under standard pressure, the heating step is not required to be carried out simultaneously with the vacuum deposition of the photochromic material onto the surface of the lens. Heat processing the lens subsequent to vacuum deposition of the photochromic material allows more precise amounts of photochromic material to be deposited on the lens and for allows for improved control of the rate of photochromic permeation. The photochromic material is allowed to permeate the surface of the plastic lens to a depth of from about 0.05 to 200 μm, preferably to a depth of about 1 to 50 μm. If the depth of photochromic permeation is less than 0.05 μm the desired lens coloration is difficult to achieve. Conversely, if the depth of the photochromic permeation is greater than 200 μm then the surface of the lens may be softened such that the scratch resistivity of the lens is lowered.

The invention achieves several advantages over prior art methods. Previous methods can only mass produce photochromic lenses with 1 or 2 colors and may require selection of an appropriate solvent or involve problems of dye adhesion. In contrast, the method of the invention enables an artisan to adjust the amount of photochromic used according to color, from one batch to another creating a lens having a variety of colors. The invention avoids the difficulty in selecting appropriate solvents to disperse the photochromic material because the use of a solvent is not involved. Furthermore, the total cost of forming a photochromic plastic lens is significantly reduced as the amount of photochromic used is approximately 1/10–1/20 the amount used by the method which premixes the photochromic into the monomer. Thus, the invention allows for the manufacture of highly reproducible, low cost, and evenly colored photochromic lenses.

When considering the photochromic characteristics such as the permeability of the photochromic and the rate at which the material darkens reversibly when exposed to light, it is desirable to use materials that have enough volume so that photochromic material can easily permeate from the surface and freely move around within the plastic lens.

Plastic lens are heat cured for UV cured or UV and heat cured materials. Suitable lens forming materials include polymethylmethacrylate and its co-polymer, acrylonitrilstyrene co-polymer, polycarbonate, cellulose acetate, polyvinyl chloride, polyethyleneterephthalate, epoxy resins, unsaturated polyester resins, polyurethane resins, and diethyleneglycolbisallylcarbonate polymer.

Materials made from UV curing resins may exhibit better photochromic characteristics than heat curing resins since they have a larger pore size which allows for easier permeation of the photochromic material into the plastic lens. UV curing resins, such as those listed above, polymerize upon irradiation of UV. However, as mentioned above, they can be used together with heat curing resins, as well. In such a case, an initiator that starts polymerization due to heat and an initiator that starts polymerization due to UV rays are added to the monomer.

For the UV curing resin, it is generally necessary to include both a light polymerizing radical initiator that creates radicals upon irradiation of UV and a radical polymerizing monomer or oligomer or pre-polymer. Additionally, one can also mix sensitizers, storage stabilizers, polymerization inhibitors, specific purpose polymers and color pigments with them. UV polymerized cationic polymers are generally preferred as the UV curing resin.

Any conventional and well known light radical initiator may be used in the invention. Typical examples include, but are not limited to, biacetyl, acetophenone, benzophenone, tetramethyldiaminobenzophenone, benzyl, benzoin, benzoinisobutylether, benzyldimethyl-ketal, tetramethylthiuramsulfide, azobisisobutylnitrile, 1-hydroxycyclohexylphenone, methylketoneperoxide, acetylacetoneperoxide, t-butylperoxide, cumenehydroperoxide, α,αbis(t-butylperoxyisopropyl)benzene, t-butylperoxyisopropylcarbonate, benzoylperoxide, di(t-butylperoxy)isophthalate, t-butylperoxybenzoate, and 3,3,4,4 tetra(t-butylperoxycarbonyl)benzophenone.

Radical polymerizable oligomers may be used for a light radical type polymerization to efficiently cure the monomer. Polymerizable monomers may be added to adjust the viscosity. Suitable light polymerizing oligomers include unsaturated polyester/styrene group, epoxy/Lewis acids, polyene/thiols and acrylic acid ester. Preferred oligomers are acrylic based and unsaturated polyester oligomers. Acrylic oligomers are roughly divided into polyesteracrylate, polyurethaneacrylate, polyetheracrylate, oligoacrylate, alkydacrylate, and polyolacrylate. Among them, acrylates of polyester, epoxy, urethane and polyol are preferred. Examples of the preferred light curing monomers with single function include, but are not limited to, laurylacrylate, 2-ethylhexylacrylate, 2-hydroxyethylacrylate, 2-hydroxyethylmethacrylate, 1,6-hexanediolmonoacrylate, and dicyclopentadieneacrylate. Examples of dual finction light curing monomers include 1,3-butanedioldiacrylate, 1,4-butanedioldiacrylate, 1,6-hexanedioldiacrylate, diethyleneglycoldiacrylate, tripropyleneglycoldiacrylate, neopentylglycoldiacrylate, polyethyleneglycol (400) diacrylate, hydroxy trimethylacetateneopentylglycoldiacrylate. Examples of light curing monomers with 3 or more functions include triethylpropanetriacrylate, pentaerythritoltriacrylate.

As stated above, the sensitizers and/or storage stabilizers may be added to the UV curing resin. Examples of suitable sensitizers include amine, urea, sulfur compounds, nitrile, phosphorous compounds, other nitrogen compounds and chlorine compounds. Examples of storage stabilizers which may be used with the invention include organic acids, such as lactic acid and benzoic acid, quaternary ammonium chlorides, diethylhydroxyamines, amide rings, nitrile compounds, urea derivatives, benzothiazols, hydroquinones, hydroquinonemonomethylethers, and bromic acid.

The amount of photochromic permeated inside the lens may be controlled to vary the intensity of the color achieved. The invention controls the amount of photochromic permeated by regulating the amount of heat used to heat permeate the photochromics inside the lens. Specifically, after uniform deposition of photochromic material on the surface of the lens using vacuum deposition, one may permeate the photochromic in a gradient fashion by controlling the heat supplied to the surface of the lens during the heat permeation step. Also, it is possible to create a gradient of permeated photochromic materials by controlling the heating times since more photochromic will permeate in the region where the lens is heated for a longer duration and relatively less photochromic materials permeate where the time for heating is short.

It is also possible to create a photochromic lens with a photochromic gradient effect by controlling the amount of photochromic material deposited on the lens. One way to control the amount of deposition would be to place the lens material on the upper part of the vacuum deposition chamber, place a blocking plate below the lens and above the photochromic vapor source, and then move the lens or blocking plate relative to each other using a motorized mechanical system. With this system, the amount of photochromic material deposited can be controlled. The system also permits gradient deposition of photochromic material. By heating the plastic lens, there will be a gradient of the amount of photochromic permeated inside the surface since the heated plastic lens has a proportional gradient of photochromic material deposited on it. Thus, the method of the invention can easily manufacture a photochromic lens with a gradient of intensity of photochromic effect.

It is possible to form a primer layer on the surface of the plastic lens. A primer layer can enhance the permeation of photochromic material into the lens. These resins may also improve the materials impact resistivity and adhesiveness of other coating layers. The primer layer may be formed from resins, heat plasticizable resins, heat curing resins and UV curing resins. Specific examples, include but are not limited to, resins such as polyamide resins, phenol resins, butyral resins, melanin resins, polyvinyl alcohol resins, cellulose resins, alkyd resins, acrylic resins, epoxy resins, urethane resins, polyester resins and silicon resins. These resins can be used alone, mixed with other resins or used as a co-polymer. The thickness of the primer layer is desirably between 0.5–2 μm.

To improve scratch resistance, it is effective to form a hard coating layer on the plastic lens. It is possible to coat liquid polymer (hard coating liquid) consisting of an organic silicon compound on the surface of the photochromic plastic lens. Organic silicon compounds of the general formula (VI) below or its hydrolysis materials are preferred.

$$R^1_a R^2_b Si(OR^3)_{4-(a+b)} \quad (VI)$$

In the formula $R^1$ is a saturated or unsaturated hydrocarbon having about 4–14 carbon atoms, $R^2$ is a hydrocarbon radical having about 1–6 carbon atoms or halogen hydrocarbons, $R^3$ is an alkyl, alkoxyalkyl, or acyl radical, and a and b are independently 0 or 1 such that a+b is 1 or 2.

A suitable functional radical $R^1$ for formula (VI) is an epoxy radical. Compounds of formula (VI) where $R^1$ is an epoxy radical are referred to as epoxysilanes. Examples of such epoxysilanes include γ-glycidoxypropyltrimethoxysilane, γ-glycidoxypropyltriethoxysilane, γ-glycidoxypropyltrimethoxyethoxysilane, γ-glycidoxypropyltriethoxysilane, γ-glycidoxypropylmethyldimethoxysilane, γ-glycidoxypropylmethyldiethoxysilane, and β-(3,4-epoxycyclohexyl)ethyltriethoxysilane.

Additional examples of compounds of formula (VI) other than those where $R^1$ is an epoxy radical but including those in which a=0, include trialkoxysilanes and triacyloxysilanes. Specific examples of those compounds include, but are not limited to, methyltrimethoxysilane, methyltriethoxysilane, vinyltrimethoxysilane, vinyltriethoxysilane, vinyltriacetoxysilane, vinyltrimethoxyethoxysilane, γ-methacryloxypropyltrimethoxysilane, aminomethyltrimethoxysilane, 3-aminopropyltrimethoxysilane, 3-aminopropyltriethoxysilane, phenylbimethoxysilane, phenyltriethoxysilane, γ-chloropropyltrimethoxysilane, γ-mercaptopyltriethoxysilane, and 3,3,3-trifluoropropyltrimethoxysilane.

The compounds of formula (VI) discussed above are all trifunctional having three $OR^3$ bonded to Si atom (a+b=1), but corresponding bifunctional compounds having two $OR^3$ radicals (a+b=2) can also be utilized. Examples of such bifunctional compounds include, but are not limited to, dimethyldimethoxysilane, diphenyldimethoxysilane, methylphenyldimethoxysilane, methylvinyldimethoxysilane and dimethyldiethoxysilane.

The compounds of formula (VI) may be used singularly, or as a mixture of at least two compounds. In particular, when a bifunctional compound is employed, it is preferably employed in combination with a trifunctional compound. In such combined use, a preferred combination of the two compounds yields an average 2>a+b>1. Furthermore, combinations with a corresponding tetrafunctional compound with a+b=0 may also be used. Examples of tetrafunctional compound include, but are not limited to, methyl silicate, ethyl silicate, isopropyl silicate, n-propyl silicate, n-butyl silicate, t-butyl silicate and sec-butyl silicate.

A compound of formula (VI) can be used as is, but is preferably used as hydrolysis material for increasing reaction speed and lowering curing temperature. When two or more multifunctional compounds having about 2–4 of the same functional groups are used in combination, they can be combined before or after hydrolysis to conductjoint hydrolysis. By hydrolysis, alcohols known as $HOR^3$ are separated, and the compound described by formula (VI) becomes a corresponding silanol. Silanol promptly dehydrates decomposes and becomes an oligomer. Therefore, the coating may be allowed to sit for about 1–24 hours after hydrolysis to make the reaction more complete.

When compounds of formula (VI) are used, it is possible to add sols to further improve the hardness of the cure, prevent occurrence of interference stripes, and add an electrostatic suppressing function. Also, to improve the spreadability when applied and to improve the homogeneity of curing membrane, various solvents such as water, low grade alcohol, acetone, ether, ketone and esters may also be used.

To enhance the reaction and curing of the hard surface coating at low temperature, curing catalysts can be used. Curing catalysts are used as necessary. For the purpose of cutting down on the curing time necessary to create a three dimensional structure of polymerized membrane when low viscosity components are used. However, curing cutolysts that weaken the stability of coating components are not desired. Examples of suitable curing catalysts include, but are not limited to, the following:

(1) Amines: such as monoethanolamine, diethanolamine, isopropanolamine, ethylenediamine, isopropylamine, diisopropylamine, morpholine, triethanolamine, diaminopropane, aminoethylethanolamine, dicyanamide, triethylenediamine or 2-ethyl-4-methylimidazole.

(2) Metal complexes: such as aluminum chelate represented by a general formula $AlX_nY_{n-3}$ wherein X stands for a radical OL in which L is a lower alkyl radical), Y is at least one group selected from a general formula $M^1COCH_2OM^2$ or $M^1COCH_2COOM^2$ in which $M^1$ and $M^2$ are lower alkyl radicals, and n is 0, 1 or 2. Examples of particularly useful chelates in terms of solubility, stability and curing a catalyst include aluminum acetylacetonate, aluminum bisethylacetoacetate monoacetylacetonate, aluminum di-n-butoxide monoethylacetonate and aluminum di-isopropoxide monomethylacetoacetate. Other examples of such metal complexes include chromium acetylacetonate, titanium acetylacetonate, cobalt acetylacetonate, iron (III) acetylacetonate, manganese acetylacetonate, nickel acetylacetonate, EDTA and complexes of Al, Fe, Zn, Zr and Ti.

(3) Metal alkoxides: such as aluminum triethoxide, aluminum tri-n-propoxide, aluminum tri-n-butoxide, tetraethoxytitanium, tetra-n-butoxy titanium or tetra-1-propoxy titanium.

(4) Organic acid salts: such as sodium acetate, zinc naphthenate, cobalt naphthenate, zinc octylate or tin octylate.

(5) Perchlorate salts: such as magnesium perchlorate or ammonium perchlorate.

(6) Organic acids and their anhydrides: such as malonic acid, succinic acid, tartaric acid, adipic acid, azelaic acid, maleic acid, o-phthalic acid, terephthalic acid, fumaric acid, itaconic acid, oxalaacetic acid, succinic anhydride, maleic anhydride, itaconic anhydride, 1,2-dimethylmaleic anhydride, phthalic anhydride, hexahydrophthalic anhydride or naphthalic anhydride.

(7) Lewis acids: such as ferric chloride or aluminum chloride (8) Metal halides: such as stannous chloride, tin chloride, tin bromide, zinc chloride, zinc bromide, terachlorotitanium, titanium bromide, thallium bromide, germanium chloride, hafnium chloride, lead chloride or lead bromide.

The catalysts described above can be used alone or as mixtures of two or more catalysts. Aluminum chelate compounds are particularly preferred.

It is possible to mix microparticles of inorganic oxides into the hard coating layer. By incorporating inorganic oxides into the hard coating layer, it becomes possible to control the hardness and index of refraction of the layer. The inorganic oxides microparticles are generally incorporated in the form of sols. Examples of sols used include microparticles of zinc oxide, silicon oxide, aluminum oxide, titanium oxide, zirconium oxide, antimony oxide, beryllium oxide, tin oxide, tungsten oxide, and cerium oxide. The microparticles can be used singularly or in mixture of two or more kinds.

The microparticles can also be used to form a refraction gradient layer. The index of refraction of the compound can be altered by the inclusion of a particular oxide microparticle. Suitable refraction altering microparticles include, but are not limited to, titanium oxide, antimony oxide, tungsten oxide, cerium oxide, zirconium oxide or tin oxide. Mixtures of refraction altering microparticles may be used. For example, a suitable mixture of refraction altering microparticles includes tin oxide covered with a microparticle mixture of tungsten oxide and tin oxide. These microparticle mixtures are easily dispersed in solvents. Such microparticle mixtures are described in detail in Watanabe et al. U.S. Pat. No. 5,094,691, issued Mar. 10, 1992, which is incorporated by reference.

As a dispersant of microparticles, organic solvents such as water, alcohol, ethers, ketones and acetones are used. It is also desirable that a stabilizer, such as an organic amine, be added to them. The particle diameter of microparticle should be between about 1–200 $\mu$m and preferably between 5–100 $\mu$m. Smaller particle sizes reduce the effectiveness of the coating layer and are harder to produce. If the particle size is larger, the stability, clarity and smoothness of the coating is impaired. Sols suitable for use in the invention, such as HIS3OM, HIS3OMN and AMT103S available from Nissan Corporation, can be obtained commercially.

Additionally, other additives may be used to improve the adhesiveness to the material or to enhance the stability of hard coating layer components. Examples of such additives include pH adjusting agents, viscosity adjusting agents, leveling agents, delustering agents, stabilizers, UV absorbing agent, antioxidation agents and so on. For the purpose of improving the flow when spreading and of improving the smoothness of the hard coating layer to lower the coefficient of friction, it is possible incorporate various surfactants in the coating components. Preferred surfactants include block or graft copolymers of dimethylsiloxane and alkyleneoxide, and fluorine surfactants.

As for hard layer coating methods, regular coating methods may be used including brush painting, bath soaking, roll coating, spray coating, flow coating, and so on. The viscosity characteristics of the hard coating materials will help determine which method of coating is selected. Besides these wet coating methods, it is possible to use dry coating method of Chemical Vapor Deposition (CVD) to form a hard coating layer. In case of forming a hard coating layer using the (CVD) method, it is desirable to form a hard coating layer after forming a refraction gradient layer.

The thickness of hard coating layer created by the above coating methods ranges from 2 $\mu$m for a plastic lens several millimeters thick. Preferably, the thickness of the hard coating layer is between about 0.4 $\mu$m and 5 $\mu$m.

A refraction gradient layer may also be used with a lens of the invention. A refraction gradient layer is a layer formed over the photochromic containing plastic lens whose index of refraction gradually changes in the direction of the thickness of the plastic lens. The composition inside the refraction gradient layer also changes gradually in the direction of the thickness of the lens. Improved impact resistance is achieved by using a refraction gradient layer. The refraction gradient layer is also capable of lowering the internal stress inside a hard coating layer. Due to the reduction of internal stress, the formation of the refraction gradient layer helps reduce the incidence of cracks in a hard coating layer. The thickness of the refraction gradient layer preferably ranges from about 100 nm to 900 nm.

The refraction gradient layer and hard coating layer, are preferably formed from an organic Si containing compound or an organic Ti containing compound or mixtures thereof. Suitable organic Si compounds include, but are not limited to, tetraethoxysilane, dimethoxydimethylsilane, methyltrimethoxysilane, tetramethoxysilane, ethyltrimethoxysilane, diethoxydimethylsilane, methyltriethoxysilane, trimethoxysilane, HSi and the like. Suitable organic Ti compounds include, but are not limited to, tetramethoxytitanium, tetraethoxytitanium, tetraisopropoxytitanium, tetra-n-butoxytitanium, tetraisobutoxytitanium, tetra-sec-butoxytitanium, tetra-t-butoxytitanium, tetradiethylaminotitanium, and the like.

As stated above, a dry coating method of CVD may be used to form a hard coating layer. CVD is a method in which a vapor phase composition undergoes a chemical reaction. A CVD method may involve the application of heat and electric energy to a gas to discharge the gas and create a plasma environment having a non-equilibrium condition. A chemical reaction occurs in this plasma environment which deposits a thin layer above the plastic lens. Types of CVD apparatus include, but are not limited to, parallel plate electrodes, capacitance coupled electrodes and induced coupled electrodes. In the invention, it is preferable to use a plasma CVD method whose electric field and magnetic field are parallel to the main surface of the lens. Using this dry method to form a hard coating layer, it becomes possible to manufacture low cost, high scratch resistance photochromic plastic lenses with ease. Furthermore, since no liquid is involved, no remaining waste liquid pollutes the environment. Also the CVD method can form a hard coating layer on photochromic plastic lenses with gradation or with multicoloring.

It is also desirable to form single or multilayers of antiglare inorganic oxide above the hard coating layer. This may be accomplished using a vacuum deposition method, CVD method or sputtering method. The antiglare layer may be formed from inorganic oxides including, but not limited to silicon oxides, aluminum oxides and titanium oxides.

A water resistance layer may be formed with organic containing cured materials made of organic polysiloxane based polymers or polymers polymerized from compounds containing perfluoalkyl radicals. The water resistant layer is formed using a vacuum deposition method, a CVD method, or a sputtering method. A photochromic plastic lens treated with such organic materials will provide the plastic lens with improved water resistivity. For the water resistance layer, alkoxysilane compounds containing siloxane bonding and aminosilane compounds containing silazane bonding, or compounds containing dual functional siloxazane bonding are preferably used.

It is possible to form a primer layer on the surface of the photochromic permeated plastic lens. Such a primer layer can improve the adhesiveness between the material and hard coating layer above it, and also improve impact resistivity. As a result, a photochromic lens which has durability against impact and which can withstand various operating environments can be manufactured. Suitable materials for forming an impact resistivity primary layer include, but are not limited to, urethane based materials and polyvinyl acetal resins.

Urethane based materials are preferred materials for the impact resistivity primer layer. The suitable urethane based materials are active hydrogen containing compounds and polyisocyanates. Examples of active hydrogen containing compounds include the alkyleneglycol group such as ethyleneglycol, 1,2-propylenegylcol, 1,3-butanediol, 1,6-hexanediol, neopentylglycol, dipropyleneglycol, diethyleneglycol, polyalkyleneglycols such as polypropyleneglycol, polyethyleneglycol, polytetramethyleneglycol, polybutadieneglycols such as poly(diethyleneadipate), poly(tetramethyleneadipate), poly(hexamethyleneadipate), poly(neopentyleneadipate), polybutadieneglycols such as poly-$\Sigma$-caprolactone, poly(1,4-butandiene)glycol, poly(1,2-butandiene) glycol; poly (alkylenecarbonates) such as poly (hexamethylenecarbonate), siliconpolyol and the like. Additionally, other well known conventional active hydrogen containing compounds can be used as well.

Examples of polyisocyanates include aliphatic and aromatic di-isocyanates such as tolylenediisocyanate, xylilendiisocyanate, 4,4-diphenyhnethanediisocyanate, 1,5-naphthalenediisocyanate, 3,3-dimethyl-4,4-diphenyldiisocyanate, 1,6-hexamethylenediisocyanate, isophoronediisocyanate, 4,4-dicyclohexylmethanediisocyanate, 1,3-bis (isocyanatemethyl)cyclohexane, and trimethylhexamethylenediisocyanate. Furthermore, a polyisocyanate such as block polyisocyante can be used as well.

The hydrogen containing compounds and polyisocyanates can be used mixed, or in the form of polymer. These urethane based materials can be prepared in the form of a urethane based solution or of urethane based particles dispersed in solvents.

Furthermore, impact resistivity primer layer materials may be formed using non-urethane based materials such as crosslinked polyvinylacetal. A primer layer made of polyvinylacetal can be created by coating the primer solution containing as its main component polyvinylacetal, hydrolyzable organosilane compounds or their posthydrolysis broken units, aluminum or titanium based alkoxide compounds, or aluminum or titanium based alkoxidediketonate compounds and curing catalysts, and heat processing the solution.

The primer compounds made from polyvinylacetal relating to the method of the invention are formed from:

(a) a polyacetal polymer comprising 10–90% acetal radical monomers, 10–90% hydroxy radical monomers and wherein the total number of acetal radical monomers and —OH radical monomers is equal too or less than 100% of the polyacetal polymer; and (b) a crosslinking compound selected from the following:
  (i) a hydrolysis material organosilane compound or its hydrolysis material as described by general formula (VII):

$$R^2_d R^3_e\text{—Si—}X^1_{4-(d+e)} \tag{VII}$$

wherein $R^2$, $R^3$ represent linear or branched hydrocarbon radicals with 1–8 carbon atoms, $X^1$ represents a hydrolysis material radical, and d, e are integers from 1 to 3, in the formula; and (ii) a hydrolysis material radical organosilane compound or its hydrolysis material as described by general formula (VIII):

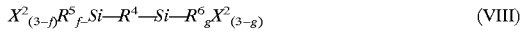
$$X^2_{(3-f)}R^5_f\text{-Si—}R^4\text{—Si—}R^6_g X^2_{(3-g)} \tag{VIII}$$

wherein $R^4$ represents an organic radical with 2–8 carbon atoms, $R^5$, $R^6$ represent linear or branched hydrocarbon radicals with 1–8 carbon atoms, $X^2$ represents a hydrolysis material radical, and f, g are integer from 0–2, in the formula; and (iii) a dialdehyde compound or glyoxal described by general formula (IX):

$$HCO\text{—}R^7\text{—}CHO \tag{IX}$$

wherein $R^7$ represents a linear or branched hydrocarbon radical with 1–6 carbon atoms; or (iv) a primer compound consisting of at least one kind of dialdehyde acetal crosslinking agent described by a general formula (X).

$$(R^9O)_2CH\text{—}R^8\text{—}CH(OR^9)_2 \tag{X}$$

wherein $R^8$ represents a linear or branched hydrocarbon radical with 2–8 carbon atoms, $R^9$ represents a saturated hydrocarbon radical with 1–4 carbon atoms, and (C) an organic solvent and water. The polyvinyl acetal comprising 1–30 weight percentage of the above mentioned polyacetal polymer (a) and 0.01–30 weight percentage of the above mentioned crosslinking agent (b).

To form a impact resistivity primer layer, hydrolyzable radicals within the organosilane compound are decomposed by hydrolysis and create silanol radicals which react with organometallic alkoxide compounds. Then, due to catalyst and heat, the reaction continues with OH radicals within polyvinylacetal. Then, a dehydration, condensation reaction occurs and crosslinking between and within molecules takes place. Molecules that function as crosslinkers comprise hydrolyzable material within the organosilane compound or its decomposed form. An organosilane compound can be added directly, or can be added as a decomposed form after hydrolysis. Either a single kind of organosilane or a mixture of two or more kinds of organosilane can be used.

Examples of organosilane compounds include, but are not limited to, halosilane compounds whose hydrolyzable radicals are halogen group atoms; alkoxysilane compounds whose hydrolyzable radicals are alkoxy radicals, carboxysilane compounds whose hydrolyzable radicals are carboxy radicals; or ketoxysilane compounds whose radicals are ketoxy radicals. The preferred choice of organosilane compounds are alkoxysilane compounds.

The hydrolyzable organosilane compound expressed by general formula (VII) is exemplified by dimethyl dimethoxysilane, dimethyl diethoxysilane, diethyl dimethoxysilane, diethyl diethoxysilane, phenylmethyl dimethoxysilane, phenylmethyl diethoxysilane, γ-chloropropylmethyl dimethoxysilane, γ-chloropropylmethyl diethoxysilane, methacryloxypropylmethyl dimethoxysilane, γ-methacryloxypropylmethyl diethoxysilane, γ-mercaptopropylmethyl dimethoxysilane, γ-mercaptopropylmethyl diethoxysilane, γ-aminopropylmethyl dimethoxysilane, γ-aminopropylmethyl diethoxysilane, methylvinyl dimethoxysilane, methylvinyl diethoxysilane, γ-glycidoxypropylmethyl dimethoxysilane, γ-glycidoxypropylmethyl diethoxysilane, methyltrimethoxysilane, methyltriethoxysilane, methyltripropoxysilane, methyltributoxysilane, methyltri (2-methoxyethoxy) silane, ethyltrimethoxysilane, ethyltriethoxysilane, ethyltripropoxysilane, ethyltributoxysilane, ethyltri (2-methoxyethoxy) silane, propyltrimethoxysilane, propyltriethoxysilane, butyltrimethoxysilane, butyltriethoxysilane, hexyltrimethoxysilane, hexyltriethoxysilane, vinyltrimethoxysilane, vinyltriethoxysilane, vinyltri (2-methoxyethoxy) silane, phenyltrimethoxysilane, phenyltriethoxysilane, γ-chloropropyl trimethoxysilane, γ-chloropropyl triethoxysilane, 3,3,3-trifluoropropyl trimethoxysilane, 3,3,3-trifluoropropyl triethoxysilane, γ-methacryloxypropyl trimethoxysilane, γ-methacryloxypropyl triethoxysilane, γ-aminopropyl trimethoxysilane, γ-aminopropyl triethoxysilane, γ-mercaptopropyltrimethoxysilane, γ-mercaptopropyltriethoxysilane, chloromethyl trimethoxysilane, chloromethyl triethoxysilane, N-β (aminoethyl)-γ-aminpropyl trimethoxysilane, N-β (aminoethyl)-γ-aminpropyl triethoxysilane, γ-glycidoxypropyl trimethoxysilane, γ-glycidoxypropyl triethoxysilane, (3,4-epoxycyclohexylmethyl) trimethoxysilane, (3,4-epoxycyclohexylmethyl) triethoxysilane, β-(3,4-epoxycyclohexylmethyl) trimethoxysilane, β-(3,4-epoxycyclohexylmethyl) triethoxysilane, tetramethoxysilane, tetraethoxysilane, tetrapropoxysilane, and tetrabutoxysilane.

The hydrolyzable organosilane compound expressed by general formula (VII) is exemplified by 1,1-bis(trimethoxysilyl) ethane, 1,1-bis(triethoxysilyl) ethane, 1,2-bis(trimethoxysilyl) ethane, 1,2-bis(triethoxysilyl) ethane, 1,3-bis(trimethoxysilyl) propane, 1,3-bis(triethoxysilyl) propane, 2,2-bis(trimethoxysilyl) propane, and 2,2-bis(triethoxysilyl) propane.

It is preferable that the organosilane compound be added to the primer composition in an amount of 0.01–10 weight percent, more preferably 0.1–5 weight percent.

Also, the dialdehyde compound expressed by general formula (IX) or the acetal compound of dialdehyde expressed by general formula (X) may be used as the crosslinking agent. The dialdehyde compound and the dialdehyde acetal compound may be used alone or in combination. Furthermore, two or more dialdehydes and/or dialdehyde acetal compounds may be used.

The dialdehyde compound expressed by general formula (IX) is exemplified by glutaraldehyde, hexanedial, 2-hydroxyhexanedial, and the like. Also the acetal compound of dialdehyde expressed by general formula (X) is exemplified by malonaldehydetetramethylacetal, malonaldehydetetraethylacetal, glutaraldehydetetramethylacetal, and the like. A preferred amount of the dialdehyde compound or the acetal compound of dialdehyde in the primer composition is in the range of about 0.01–30 weight percent.

The aluminum or titanium alkoxide or alkoxydiketonate may be used as the organometallic alkoxide compound. These compounds can be used alone or mixed with two or more compounds. The organometallic alkoxide compound can easily react with organosilane compounds or their hydrolysis condensates, and the product from the reaction then reacts with OH radicals in the polyvinylacetal due to heat and catalyst. The organometallic alkoxide is considered to function as a catalyst that promotes the dehydration condensation reaction of OH radicals within the polyvinylacetal and the silanol radical created at hydrolysis condensate organosilane. The organometallic alkoxide functions as a crosslinking agent which works with the organosilane compound in hydrolysis condensation.

Suitable organometallic alkoxide compounds include, for example, aluminum trimethoxide, aluminum triethoxide, aluminum tripropoxide, aluminum tributoxide, titanium tetramethoxide, titanium tetraethoxide, titanium tetrapropoxide, titanium tetrabutoxide, aluminum dipropoxyacetylacetonate, aluminum dipropoxy ethylacetoacetate, aluminum dibutoxy acetylacetonate, aluminum dibutoxyethylacetoacetate, titanium dimethoxybis(acetylacetonate), titanium diethoxybis(acetylacetonate), titanium dipropoxybis(acetylacetonate), titanium dibutoxybis(acetylacetonate), titanium dipropoxybis(ethylacetoacetate), and titanium dibutoxybis(ethylacetoacetate). Among these, the titanium alkoxides are preferred.

It is preferable that the amount of organometallic alkoxide compound in the primer composition range 0.01–10 weight percent, more preferably 0.1–3 weight percent. If the amount of the organometallic alkoxide compound with respect to the amount of the organosilane compound exceeds 50 mol percent, the impact resistivity may be lowered.

There is no specific limitation in selecting a curing catalyst as long as it promotes the dehydration condensation reactions among the organosilane compound, the condensates of the organometallic alkoxyd compound after hydrolysis, OH radicals within polyvinylacetal and silanol radicals. The curing catalyst is exemplified by organic tin compounds such as dibutyl tin dilaurate and dibutyl tin diacetate, organic amine compounds such as propylamine, butylamine, dibutylamine, triethanolamine, tetramethylguanidine, methylimidazol, and dicyandiamide; and organometallic complexes such as aluminum acetylacetonate and iron acetylacetonate. These compounds can be used alone as a mixture of two or more catalysts. It is preferable that the amount of the curing catalyst in the primer composition range from about 0.002–1 weight percent, more preferably 0.005–1 weight percent.

A urethane based material or a polyvinyl acetal can be prepared in the form of a solution or as particles dispersed in solvent. Organic solvents used in the primer composition include, but are not limited to, hydrocarbons halogenated hydrocarbons, the alcohols, ketones, esters and ethers. Furthermore, other known solvents that are capable of satisfactorily dissolving polyvinyl acetal may also be employed as preferred solvents. In particular, preferred solvents include methanol, ethanol, propanol, butanol, hexanol, methylcellosolve, and ethylcellosolve. The foregoing solvents may be used alone or two or more types of solvents may be used as a mixed solvent. The amount of water in the primer composition ranges from about 0.1–20 weight percent, as a necessary component for hydrolysis. If the amount of water added is too large, the smoothness of the primer surface may be impaired, and if there is not enough water, the period at which primer solution can be used is generally shortened.

The materials for the impact resistivity primer layer can contain various leveling agents to improve coating characteristics, UV absorbent and oxidation retarder to improve weather resistance, dyes and pigments including photochromic dyes and pigments, and other known additives to improve the functionality of the primer layer.

There is no restriction in the coating method for the impact resistivity primer layer. Coventional methods which may be used include, but are not limited to, spin coating methods, spray methods and dipping methods. It is preferable to pre-process the surface of optical plastics with an alkaline process, a plasma process, and/or a UV process. Dry coating methods such as chemical vapor deposition and vacuum deposition can also be used.

It is preferable that the thickness of the impact resistivity primer layer range from about 0.01–30 $\mu$m and, more preferably 1–20 $\mu$m. The thickness of the impact resistivity primer layer after being cured is preferably about 0.1–5 $\mu$m and, more preferably 0.2–3 $\mu$m. If the thickness of the impact resistivity primer layer is thinner than 0.1 $\mu$m, improvement in shock absorbing may not be sufficient. If the thickness is thicker than 5 $\mu$m, the impact resistivity primer layers heat resistivity may decrease.

Just as described above with regard to the hard coating layer, it is also possible to mix microparticles of inorganic oxides into an impact resistivity primer solution. These microparticles can adjust the index of refraction and improve hardness. Microparticles dispersed in water or organic solvent can be used and are commercially available. It is preferable that the average diameter of these inorganic oxide microparticles be 1–300 nm and more preferably 1–50 nm. If the diameter of these inorganic oxide microparticles becomes greater than 300 nm, fogging of the lens due to diffusion of light occur.

It is preferable that the amount of the microparticles in the impact resistivity primer composition range from about 0.1–30 weight percent. However, when added, the kinds of microparticles and the amount should be carefully adjusted so that the index of refraction of cured impact resisitivity primer layer matches or becomes very close to index of refraction of the plastic lens.

In case a high refracting plastic lens material with an index of refraction above 1.6 is used, it is preferable to add 1–5 weight percent of microparticles or their compounding forms made from high refracting compounds such as titanium oxide, zirconium oxide, iron oxide, antimony oxide, tin oxide, tungsten oxide, and cerium oxide, with respect to 1 weight percent of polyvinyl acetal. These inorganic microparticles can also be added into primer layer made of urethane group materials.

The impact resistivity primer layer can be formed over a gradient possessing photochromic lenses or multicolored photochromic plastic lens. This allows manufacture of better appearing photochromic plastic lenses with high durability under various environments. On top of an impact resistivity primer layer, a hard coating layer may be formed of organic silicon using the above mentioned wet method or by the dry method of CVD. This allows manufacturing of better appearing photochromic plastic lens with high durability and improved scratch and impact resistance. A primer layer may also be formed from a polyvinyl acetal. A preferred polyvinyl acetal comprises a polyvinyl acetal of formula (XI):

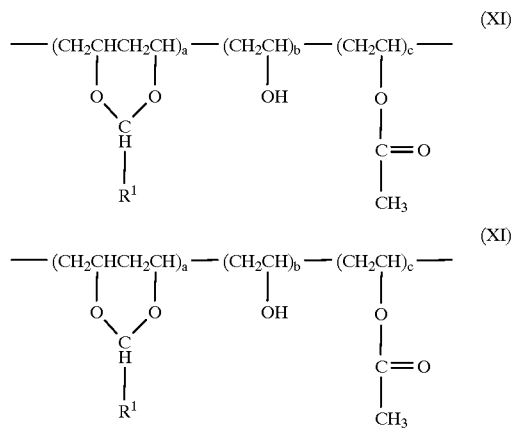

wherein $R^1$ represents a hydrogen atom or a saturated hydrocarbon radical having 1–20 carbon atoms, a represents a composition unit fraction of acetal radicals and is between 10–90, b represents a composition unit fraction of OH radicals and is between 0–10, and c represents a composition unit fraction of acetyl radicals and is between 0–10 where a+b+c=100.

Commercially available materials useflul in the invention include, but are not limited to, a) Sol of dispersed microparticles of inorganic oxides:

HIS30M Nissan Chemical Corp., $SnO_2/WO_3$ mixed microparticle methanol dispersed sol, average particle diameter=25 μm, solid material percent=30%.

HIS30MN Nissan Chemical Corp., $SnO_2/WO_3$ mixed microparticle methanol dispersed sol, average particle diameter=30 μm, solid material percent=30%.

AMT130S Nissan Chemical Corp., $SbO3/WO5$ mixed microparticle methanol dispersed sol, average particle diameter=15–20 μm, solid material percent=30%.

b) Polyvinylbutylal resins:

ESLEC BM1Sekisui Chemical Corp., avg. polymerization degree=600, degree of butylal=65%

ESLEC BM2Sekisui Chemical Corp., avg. polymerization degree=800, degree of butylal=68%

ESLEC BM5Sekisui Chemical Corp., avg. polymerization degree=850, degree of butylal=65%

ESLEC BMSSekisui Chemical Corp., avg. polymerization degree=1000, degree of butylal=70% c) Surfactants:

FLUORARD FC430 Sumitomo 3M Corp., fluorine based surfactants

SH30PA Toray Dow Corning Corp., silicone based surfactants

L7001Japan Unicar Corp., silicone based surfactants.

An embodiment of the invention provides a process of manufacturing a photochromic plastic lens with improved scratch resistance, which consists of a deposition process which deposits photochromic on the surface of the plastic lens material using vacuum deposition method, a heat permeation process which permeates photochromic inside the surface of the plastic lens material, and a coating process that forms a hard coating layer using the CVD method, without wet processing. This will result in simplification of manufacturing facilities and lower cost, while improving the scratch resistance of a lens having regions of permeated photochromic material inside.

Also, by forming a primer layer on top of the lens material having the regions of permeated photochromic inside the surface, a photochromic plastic lens with improved impact resistance can be obtained. Furthermore, by forming a hard coating layer above the primer layer, an easily manufacturable photochromic plastic lens that excels in scratch resistance and impact resistance is achieved.

The photochromic plastic lens of the present invention are better looking and higher in durability than previously manufactured lenses. The photochromic plastic lenses are able to suit the needs of various eyeglass users under varying environmental conditions. The following examples are intended to illustrate, not limit, the invention.

EXAMPLE 1

As a lens material, UV curing acrylic resin was used. A shaping method of the material was carried out as set forth in detail below.

First, a liquid form of a curing acrylic resin was injected into a glass mold that had a cavity in the shape of a lens. Two metal halide lamps of 120 W irradiation power 25 cm were placed above and below the resin injected glass mold. UV rays irradiated the mold for 2 minutes. The ambient temperature of the UV irradiation room was set at 100° C. Upon the completion of irradiation, the material was anneal processed in a heat convection oven for 2 hours at 110° C. to rid it of any imperfection.

The spirooxazine group of materials were used as the photochromic and were mixed thoroughly and placed into an evaporation source of a vacuum deposition apparatus.

The vacuum level was lowered to $5\times10^{-5}$ torr using a pump, and then the evaporation source was heated so that the photochromic material was dispersed and deposited on the surface of the lens material. The lens material with the deposited photochromic was transparent, but a slight interference color was observed. The lens material was in a heated convection oven for 1 hour at 120° C. so that the photochromic deposited on the surface of the plastic lens material permeated into the surface of the lens material and then dispersed. The residual photochromic which did not permeate into the surface was washed away with cleaning equipment.

To add the scratch resistance and antiglare characteristics, a hard coating layer made of organic silicon group materials was formed via dipping method. It was then cured by heating for 4 hours at 110° C. Above this hard coating layer, an inorganic multilayer antiglare coating made of $SiO_2$, $Al_2O_3$, $TiO_2$ was formed using vacuum deposition method. The photochromic plastic lens manufactured as described above did not have initial color, and turned homogeneous brown under the sunlight.

EXAMPLE 2

A plastic lens material created from the same materials and by the same method as the Example 1 was used. A polyester resin, sold as Denka Vinyl AKT 1000 polyester to which a block type isocyanate was added such that a 1:1 ratio of —NCO and —OH radicals was formed, was coated onto the surface of the plastic lens material using a dipping method, and was heated for 1 hour at 100° C. in a heat convection oven. The material was then cured to form a primer layer.

Next, the same photochromic material and the same vacuum deposition method as recited in Example 1 was used to deposit the photochromic material on the surface of the primer layer. The lens material was heated for 10 minutes using far infrared rays, to allow the photochromic material to permeate and spread inside the surface of the primer layer. The residual photochromic which do not permeate into the surface was washed away with cleaning equipment. Organic silicon group materials were coated onto the lens material using a dipping method, and were heated for 4 hours at 110° C. and cured to form a hard coating layer. Above the hard coating layer, an inorganic multilayer antiglare coating made of $SiO_2$, $Al_2O_3$, $TiO_2$ was formed using a vacuum deposition method. The photochromic plastic lens manufactured as described above did not have an initial color, and turned homogeneous brown under the sunlight.

EXAMPLE 3

A plastic lens material created from the same materials by the same method as the Example 1 was used. On the convex surface of lens material, deposition of the chromene group and spirooxazine group materials was accomplished using the vacuum deposition method, as set forth below:

First, the photochromic material was pre-mixed at a pre-calculated mixing ratio such that they would turn brown in sunlight. The mixture contained 4 parts of a yellow chromene group compound, 3 parts spirooxazine blue and 3 parts spirooxazine red. Approximately 0.01 g was placed in the evaporation source. The lens material was placed 10 cm above the evaporation source. The final thickness of deposited photochromic layer was established at 700 Å using quartz vibration controller (Japan Vacuum technology Corp.: CRTM5000) and vacuum deposition sensor controller (Japan Vacuum technology Corp.: CRTS4). The vacuum level was lowered to $5 \times 10^{-5}$ torr using a pump, and then the evaporation source was heat so that photochromic were dispersed and deposited on the surface of the lens materials.

In this Example, a part of dispersed photochromic was blocked by a controllable blocking plate when deposition of the photochromic was occurring. The blocking region was controlled by moving the blocking plate slowly.

At first, half of the lens material surface was blocked so that no photochromic material deposited in the blocked region. The block was then moved so that the blocked region became gradually smaller. Moving the blocking platecreated a gradient of the amount of the photochromic material deposited on the surface of the lens material. Though transparent, a slight interference pattern was observed on the region where the photochromic material was deposited. Interference stripes were observed in the region where there was a gradient of deposited photochromic amount. The lens, with the gradation of deposited photochromic material, was heated in a heat convection oven for 1 hour at 120° C. The amount of photochromic permeated into the surface of the lens material and dispersed by this heating was proportional to the amount deposited on the surface of the plastic lens material. A photochromic lens with a gradient of intensity was obtained.

The residual photochromic material which did not permeate into the surface was washed away with cleaning equipment. To add scratch resistance and antiglare characteristics, a hard coating layer made of organic silicon group materials was formed via the dipping method. It was then cured by heating for 4 hours at 110° C. Above the hard coating layer, an inorganic multilayer antiglare coating made of $SiO_2$, $Al_2O_3$, and $TiO_2$ was formed using the vacuum deposition method. The photochromic plastic lens 10 manufactured as described above did not have an initial color, and turned a gradient of brown colors in sunlight.

EXAMPLE 4

A plastic lens material created from the same materials and by the same method as set forth in Example 1 was used. Manufacturing of a photochromic plastic lens was conducted with the apparatus shown in FIG. 1.

Figure 1B:
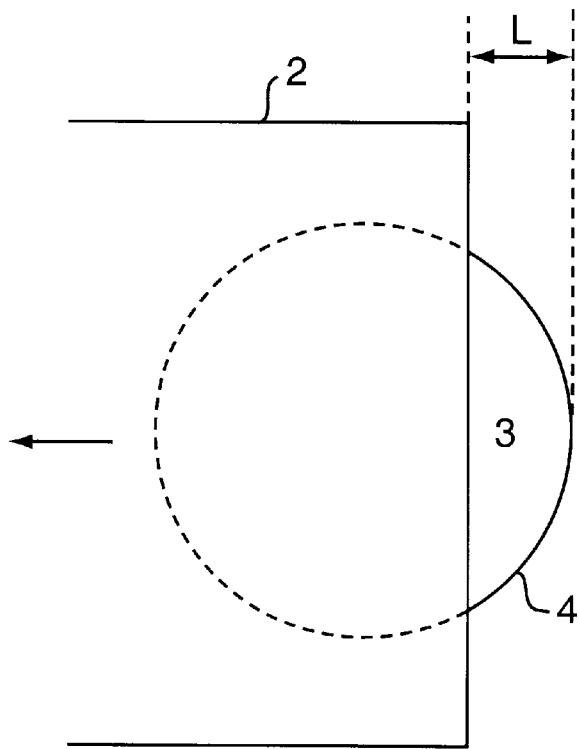

As illustrated by FIG. 1, lens material 4 which has photochromic 3 deposited on it, was placed with its concave (or convex) side facing upward. A far infrared ray source was placed 1–10 cm above the lens material 4. A blocking plate 2 was placed parallel to the surface of the lens between the lens material 4 and far infrared source 1. A moving mechanism 5 moved the blocking plate in the direction of the arrow.

At first, the blocking plate 2 was placed so that ⅓ of the surface of the lens material was blocked from the heat source. When heated in this state, only ⅔ of the lens surface which is unprotected was heated, while the remaining region was not heated.

The blocking plate 2 was designed to move slowly in the direction of the arrow by the mechanical motor system. As time passed, the plate 2 moved in the direction of the arrow so that the heated area increased and eventually all regions of the lens material 4 received heat. The program for moving this plate was created in advance for the desired pattern.

By the movement of the plate 2, the regions of the surface of the lens material 4 which is blocked eventually received heat. By the movement of the blocking plate 2, a gradient was created in the amount of heat received on the surface of the lens material 4. The amount of photochromic material 3 which permeated inside the surface of the lens material 4 was proportional to the amount of heating. Therefore, there was a gradient in the amount of photochromic permeated inside the lens material 4. By the method described above, a photochromic plastic lens with a gradation effect was obtained. The residual photochromic material which did not permeate into the surface was washed away with cleaning equipment.

To add the scratch resistance and antiglare characteristics, a hard coating layer made of organic silicon group materials was formed via a dipping method. It was then cured by heating for 4 hours at 110° C. Above this hard coating layer, an inorganic multilayer antiglare coating made of $SiO_2$, $Al_2O_3$, $TiO_2$ was formed using the vacuum deposition method. The photochromic plastic lens manufactured as described above did not have initial color, and turned a gradient of brown colors in sunlight.

EXAMPLE 5

Figure 2A:
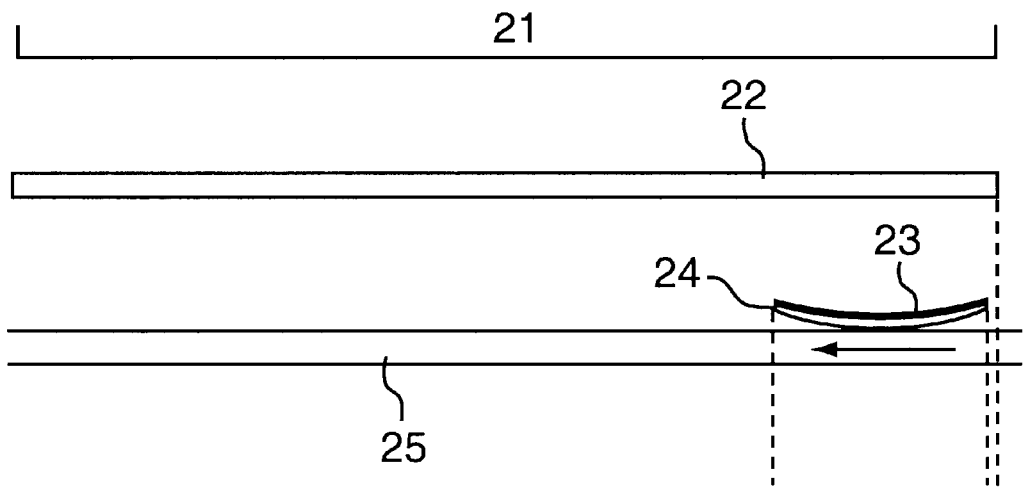
FIG. 2 is a schematic diagram of the equipment for manufacturing photochromic plastic lenses with gradation, illustrating an embodiment of the invention.
Figure 2B:
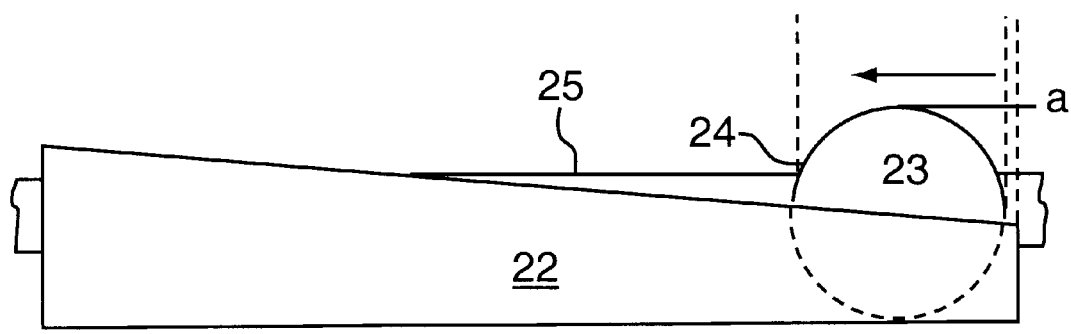

A plastic lens material created from the same materials by the same method as set forth in Example 1 was used. As shown in FIG. 2, a lens 24 which had photochromic 23 deposited on it was placed, with its concave (convex) side facing upward. A far infrared ray source 21 was placed 10 cm above the lens 24. A blocking plate 22 is placed between the lens material 24 and far infrared source 22. The blocking plate 22 had a diagonal cut when viewed from above, as shown in FIG. 2.

At first, the lens 24 was placed such that approximately half of its surface was blocked by the blocking plate 22. Heating was accomplished in this state for approximately 10 minutes. Then the blocking plate 24 was slowly moved in the direction of the arrow with the moving mechanism 25. As mentioned above, half of the surface of the lens material 24 was heated without interruption. By moving the lens in the direction of the arrow, the blocked region changed gradually toward zero. Due to this, by the time heating of the lens was completed, a gradient was created depending on the amount of heat received by the photochromic 23 on the lens 24. The amount of photochromic 23 permeated inside the surface of the lens material 24 was proportional to the amount of heating. Therefore, there was also a gradient in term of the amount of photochromic material permeated inside the lens 24. By the method described above, a photochromic plastic lens with gradation effect was obtained. The residual photochromic material which did not permeate into the surface was washed away by means of the cleaning equipment.

To add scratch resistance and antiglare characteristics, a hard coating layer made of organic silicon group materials was formed via a dipping method. This was then cured by heating it for 4 hours at 110° C. Above the hard coating layer, inorganic multilayer antiglare layer made of $SiO_2$, $Al_2O_3$, $TiO_2$ was formed using a vacuum deposition method. The photochromic plastic lens manufactured as described above did not have an initial color, and turned a gradient of brown colors in sunlight.

EXAMPLE 6

Figure 3:
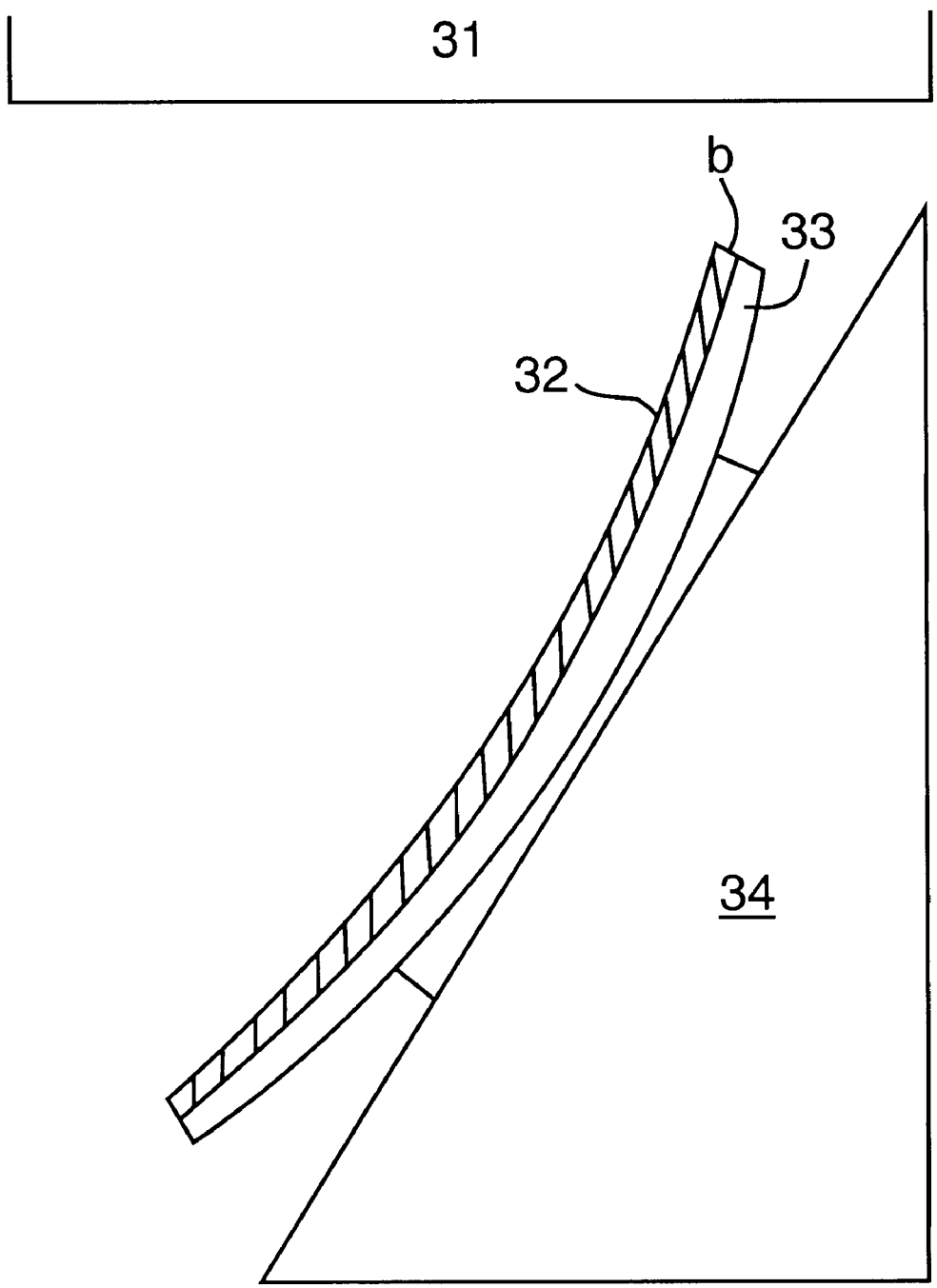
FIG. 3 is a schematic diagram of the equipment for manufacturing photochromic plastic lenses with gradation, illustrating an embodiment of the invention.

A plastic lens 33 created from the same material by the same method as in Example 1 was used. FIG. 3 is an outline figure of the manufacturing equipment for forming a photochromic plastic lens according to the present invention.

As shown in FIG. 3, a lens 33 which has photochromic 32 deposited on it was placed on top of the lens stand 34 and heated with a far infrared ray source 31 from above.

As observable from FIG. 3, the distance between the far infrared lamp 31 and lens 33 with deposited photochromic material 32 varied from spot to spot. Due to the difference in distance, the amount of heat received by the lens 33 differed. There was a 60° degrees of temperature difference between the region of lens 33 on the surface closest to the far infrared lamp 31 and the region farthest away from the lamp 31. Therefore, a gradient was created of the amount of heat received on the surface of the lens materials 33. As mentioned in the Example 5, the amount of photochromic material 32 which permeated inside the surface of the lens 33 was proportional to the amount of heating. Consequently, there was also be a gradient in term of the amount of photochromic material permeated inside the lens material 33, and a photochromic plastic lens with a gradation effect was obtained. The residual photochromic material which did not permeate into the surface was washed away by means of the cleaning equipment.

To add scratch resistance and antiglare characteristics, a hard coating layer made of organic silicon group materials was formed via a dipping method. This was then cured by heating for 4 hours at 110° C. Above the hard coating layer, an inorganic multilayer antiglare layer made of $SiO_2$, $Al_2O_3$, $TiO_2$ was formed using a vacuum deposition method. The photochromic plastic lens manufactured as described above did not have an initial color, and turned a gradient of brown colors in the sunlight.

EXAMPLE 7

Figure 4A:
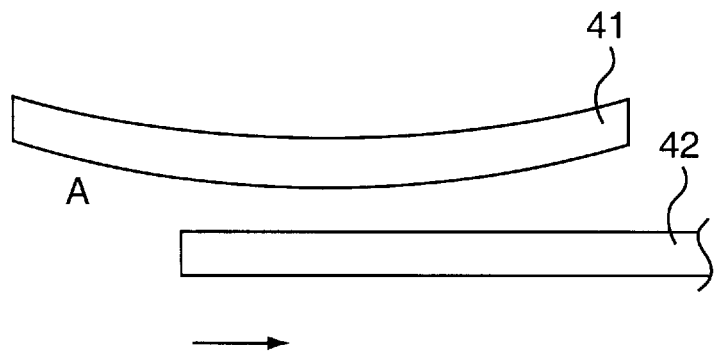
FIG. 4 is a schematic diagram of the equipment for manufacturing photochromic plastic lenses with multiple colors, illustrating an embodiment of the invention.
Figure 4B:
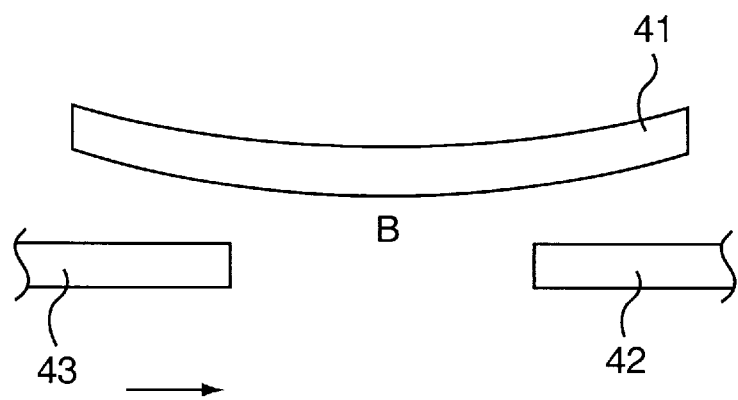

This Example is explained using FIG. 4. FIG. 4 is an outline figure of the apparatus used in manufacturing multicolor photochromic plastic lens.

This Example produced a photochromic lens that had the same color on top and bottom regions when viewed from the front, and that had its intermediate region coated with a separate coloring photochromic material. A plastic lens 41 created from the same material by the same method as in Example 1 was used.

First, a lens 41 was placed parallel to the ground as shown in FIG. 4(a), and a blocking plate 42 that is capable of moving in the direction of the arrow was placed below its convex surface, and an evaporation source (not displayed) made of photochromic material was placed below the blocking plate 42. In this state, the chromene group and spirooxazine group materials used as photochromic material were premixed at a precalculated mixing ratio such that they would turn brown, and then 0.01 g of photochromic material was measured and placed into the evaporation source. The lens material 41 was placed 10 cm above the evaporation source. The final thickness of deposited photochromic layer was established to be 700 Å, using a quartz vibration controller (Japan Vacuum technology Corp.: CRTM5000) and vacuum deposition sensor controller (Japan Vacuum technology Corp.: CRTS4). The vacuum level was lowered to $5\times10^{-5}$ torr using a pump. The evaporation source was heated so that the photochromic material evaporated and was dispersed. A part of the dispersed photochromic material was blocked by the blocking plate 42, and the remaining part was deposited onto unblocked region A.

Next, a photochromic material different from the one deposited on region A was used, and deposited on the surface of the region B. As shown in FIG. 2, due to blocking plates 42 and 43, the dispersion of the photochromic material was blocked from the lens material 41 except for the region B, and thus deposition took place only in the region B.

Figure 4C:
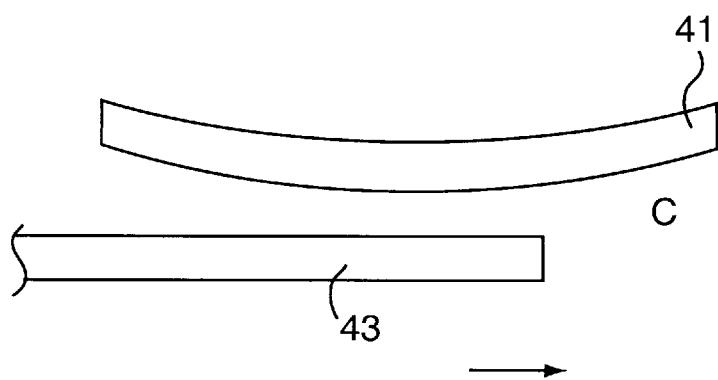

Next, as shown in FIG. 4(c), the blocking plate was moved so that the photochromic material was deposited only on the surface of region C of the lens material.

Heating of the photochromic deposited lens material 41 was accomplished in a heat convection oven for 1 hour at 120° C. so that the photochromic deposited on the surface of the plastic lens material permeated into the surface of the lens and was dispersed. The residual photochromic material which did not permeate into the surface was washed away by means of cleaning equipment.

To add scratch resistance and antiglare characteristics, a hard coating layer made of organic silicon group materials was formed via a dipping method. This was then cured by heating for 4 hours at 110° C. Above the hard coating layer, inorganic multilayer antiglare coating made of $SiO_2$, $Al_2O_3$, $TiO_2$ was formed using a vacuum deposition method. The photochromic plastic lens manufactured as described above appeared, when viewed from front, with the top and bottom parts having the same color while having a different color around the middle, in the sunlight. Thus, a multicolored photochromic plastic lens was obtained.

EXAMPLE 8

In this Example, a hard coating layer was formed using a CVD method on a photochromic plastic lens.

A plastic lens was created from the same materials and by the same method as in Example 1. On the convex surface of the lens, chromene group and spirooxazine group materials were deposited using a vacuum deposition method. This was accomplished as follows:

First, the photochromic material was pre-mixed at a precalculated mixing ratio such that it would turn brown in sunlight. Approximately 0.01 g of the photochromic material was then placed in the evaporation source. The lens material was placed 10 cm above the evaporation source. The final thickness of the deposited photochromic layer was set to be 700 Å using a quartz vibration controller (Japan Vacuum technology Corp.: CRTM5000) and vacuum deposition sensor controller (Japan Vacuum technology Corp.: CRTS4). The vacuum level is lowered to $5\times10^{-5}$ torr using a pump, and then the evaporation source is heated so that photochromic material is dispersed and deposited on the surface of the lens material. The lens with the deposited photochromic material was transparent, and had a slight color of interference. Heating this lens, with the deposited photochromic material was accomplish in a heat convection oven for 1 hour at 120° C. to let the photochromic material permeate into the surface of the lens and disperse. The residual photochromic material which did not permeate into the surface was washed away with cleaning equipment.

To add scratch resistance and antiglare characteristics, a hard coating layer was formed above the photochromic plastic lens manufactured by the method described above. For vacuum deposition equipment, Balzers Corp. Plasma Electric Chemical Vapor Deposition (PECVD) equipment and vacuum deposition equipment were used. Heating of the evaporation source was accomplished by means of electron beams.

A refraction gradient layer and a hard coating layer above the refraction gradient layer was then formed on the surface of photochromic plastic lens. The following is the description of the process used to form the refraction gradient layer.

First, methyltriethoxysilane was heated in a container attached to the vacuum chamber. The gaseous form of methyltriethoxysilane was allowed to flow into the vacuum chamber at 100 SCCM. When the pressure inside the vacuum chamber became 0.7 Pa, a magnetic field was created between the electrodes by allowing 5 A of current through electromagnetic coil outside the chamber, and at the same time the high frequency output was increased to 2 kW for three minutes. Because of this, plasma was produced. Gradually the input of the cathode was increased at 40 W/min. and allowed to reach 2.5 kW. Within 12 minutes of this period, a refraction gradient layer of a gradually changing index of refraction was created. The thickness of the refraction gradient layer was 200 nm.

Following the refraction gradient layer making process, oxygen gas was allowed to flow into the vacuum chamber at 50 SCCM, the vacuum chamber pressure was set at 0.5 Pa, with a flow of methyltriethoxysilane gas at 180 SCCM, a high frequency output of cathode at 2.5 kW, and current through electromagnetic coil outside the chamber of 5 A forming the first hard coating layer in 20 minutes. Then, the vacuum chamber pressure was changed to 0.8 Pa, and the cathode output to 3 kW while keeping the other parameters constant, which formed the second hard coating layer on top of the first hard coating layer after 20 minutes.

Finally, the oxygen flow rate was brought up to 200 SCCM, the vacuum chamber pressure to 1.0 Pa, and the other parameters maintained constant, thereby creating a third layer of hard coating layer on top of the second hard coating layer. The thickness of the resulting hard coating layer was about 2 μm.

Above the third hard coating layer, inorganic multilayer antiglare coating made of $SiO_2$, $Al_2O_3$, $TiO_2$ was formed using a vacuum deposition method. The photochromic plastic lens manufactured as described above did not have an initial color, and turned homogeneous brown in the sunlight.

EXAMPLE 9

In this Example, urethane group resins with a high index of refraction were used as the plastic lens. As described in Example 1, deposition was made of the photochromic material on the convex surface of the lens by a vacuum deposition method. The photochromic material was pre-mixed at a precalculated mixing ratio such that they would turn brown in sunlight. The mixture contained 4 parts of a yellow chromene group compound, 3 parts spirooxazine blue and 3 parts spirooxazine red. Approximately 0.0 g was placed in the evaporation source. The lens material was placed 10 cm above the evaporation source. The final thickness of deposited photochromic layer was set to be 700 Å using a quartz vibration controller (Japan Vacuum technology Corp.: CRTM5000) and a vacuum deposition sensor controller (Japan Vacuum technology Corp.: CRTS4). The vacuum level was lowered to $5\times10^{-5}$ torr using a pump, followed by heating the evaporation source so that photochromic were dispersed and deposit on the surface of the lens. The lens with the deposited photochromic material was transparent, and had a slight color of interference. Heating of the lens with the deposited photochromic material, was carried out in a heat convection oven for 1 hour at 120° C. to let the photochromic material permeate into the surface of the lens and disperse. The residual photochromic material which does not permeate into the surface was washed away by means of cleaning equipment.

To add scratch resistance characteristics, a primer layer and hard coating layer was formed above the photochromic plastic lens manufactured by the method described above. The following is the description of the method used to form such a layer.

Primer layer compounds were formed by mixing 25 parts by weight of block form of polyisocyanate (Colonate 2529, by Japan Polyurethane Industry Inc.), 18 parts by weight of polyesterpolyol and 100 weight percent of ethylcellosolve together. Then 140 parts by weight of a commercially available methanol dispersed sol with average particle diameter of 10–15 μm with the ratio of tin oxide and tungsten oxide being 100/40 parts by weight were added. A 30% solid material percent of tin oxide and tungsten oxide and 0.15 weight percent of silicon group surfactants was added into the above mixture.

A plasma process was used to strengthen the adhesion between the photochromic plastic lens and a primer layer to be coated onto the lens. The plasma process occurred at an oxygen gas pressure of 0.2 Torr, RF output of 200 W, and a process time of 30 seconds. The primer compounds prepared above were then coated on top of the concave surface of this high refractive index plastic lens using a dipping method (pull up speed of 18 mm/min.). The primer layer thickness was set to be approximately 2 μm. The high refractive index plastic lens with the primer coating was placed in a heat oven, and heat processed for 60 minutes at 130° C., forming a cured primer layer made from the primer compounds. The index of refraction of the primer layer upon curing was approximately 1.6.

To add scratch resistance and antiglare characteristics for the primer layer containing lens, a hard coating layer made of organic silicon group materials was formed via the dipping method. This was then cured by heating for 4 hours at 110° C. Above the hard coating layer, an inorganic multilayer antiglare coating made of $SiO_2$, $Al_2O_3$, $TiO_2$ was formed using a vacuum deposition method. The photochromic plastic lens manufactured as described above did not have an initial color, and turned a gradient of brown colors in the sunlight.

EXAMPLE 10

The following process was conducted under the same conditions as set forth in Example 9. The photochromic plastic lens was formed via the vacuum deposition steps used in Example 9.

A primer layer composition was prepared as follows:

Hydrolysis was accomplished of a mixture containing 2.2 parts by weight of methyltrimethoxysilane, 19.8 parts by weight of methanol, 0.9 parts by weight of 0.001N hydrochloric acid in the container with a spinning table, for 1 hour.

Hydrolysis condensates of organoalkoxysilane/organotitanate were obtained by adding 2.2 parts by weight of titanium tetra-n-butoxide and 19.8 parts by weight of n-propanol into the above post-hydrolysis decomposed materials and thoroughly mixing for 30 minutes.

133.3 parts by weight of $SnO_2/WO_3$ mixed microparticle dispersed sol (HIS30M, by Nissan Chemical Corp.; and average particle diameter of 25 μm, 30% solid material percent), 2.0 parts by weight of dibutyltindilaurate as a curing catalyst, 1.3 parts by weight of fluoride based surface activating agent FLUORARD FC430 by Sumitomo 3M Corp. were added to the obtained solution of post-hydrolysis decomposed materials. Then, a solution of 40 parts by weight of polyvinylbutylal resin ESLECBM2 (Sekisui Chemical Corp. Average polymerization degree of 800, 68 percent degree of butylal) solved in 360 parts by weight of methanol, 70.2 parts by weight of methanol, 328.3 parts by weight of n-propanol, and 20 parts by weight of pure water were added into the mixture, and mixed for 1 hour. The final primer composition was obtained after filtering the mixture with 3 μm pore membrane filter.

Hydrolysis was conducted by adding 40 of 0.01N hydrochloric acid into the rapidly spinning 180 parts by weight of glycidoxypropyltrimethoxysilane in the container, and mixing them using magnetic stirrer for 1 hour. Add 630 parts by weight of $SnO_2/WO_3$ mixed microparticle dispersed sol (HIS30M, by Nissan Chemical Corp.), 4 parts by weight of ethylenediamineacetic aluminum as a curing catalyst, 0.45 weight percent of silicon based surface activating agent SH30PA by TorayDow Corning Corp., were added to the obtained solution of posthydrolysis decomposed materials. The final primer composition was obtained after filtering the well stirred mixture with a 3 μm pore membrane filter.

For preprocessing, dipping was accomplished of a plastic lens with a 4.00 correction degree, a middle thickness of 1.0 mm, and an index of refraction of 1.6 made of heat curing urethane resin into a 10% NaOH solution at 60° C. for 5 minutes. The lens was washed with warm water and dried. Using a dipping method (pull up speed of 5 mm/sec), the primer compound was coated on both sides of the plastic lens, and heat processed at 90° C. for 30 minutes to cure the primer.

Coating was accomplished of a 5 layer antiglare layer made from the $SiO_2/ZrO_2$ group of materials on both sides of the plastic lens that already has a primer layer and a hard coating layer, using a vacuum deposition method.

To evaluate the adhesiveness of the membrane, crosshatch testing is conducted as follow. Creation is made of a 1 mm grid (100 squares total) and cut on the surface of the coating layer using a knife. A cellophane adhesive tape (Cellotape, Nichiban Corp.) is stuck hard onto the grid surface of the membrane, wherein a corner of the tape is held and the tape quickly removed.

After repeating the process 10 times, the number of squares (X) of membrane still stuck on the plastic surface are counted and expressed as X/100. In this case, the larger the X, better the adhesiveness of the membrane. Thus, if the result of cross-hatch testing is 100/100, it shows that the membrane is not removed at all.

What is claimed is:

1. A method of manufacturing a photochromic plastic lens comprising the steps of:
    vacuum depositing a photochromic material onto a surface of a plastic lens to form a photochromic deposited lens, and heating the photochromic deposited lens for a time and at a temperature sufficient to allow the photochromic material to permeate the lens.

2. A method of claim 1, wherein the plastic lens is formed by a reaction injection molding process comprising curing UV curing resins or heat curing resins by irradiation of ultraviolet rays or through the addition of heat.

3. A method of claim 1, wherein the plastic lens is formed by a reaction injection molding process comprising curing UV curing resins by the irradiation of ultraviolet rays.

4. A method of claim 1, wherein the photochromic deposited lens is heated such that the amount of photochromic material permeated into the lens is directly proportional to the amount of photochromic material deposited onto the lens forming a photochromic gradient.

5. A photochromic permeated plastic lens manufactured by the method of claim 1.

6. A method of claim 1, wherein the plastic lens comprises a front surface and a back surface, the front surface having at least a first surface region and a second surface region, further comprising the steps of vacuum depositing a photochromic material on the first surface region, and vacuum depositing a different photochromic material on the second surface region.

7. A method of claim 6, wherein the front surface further contains a third surface region, further comprising the steps of vacuum depositing onto the third surface region a photochromic material which is different than the photochromic material deposited on the first and second surface regions.

8. A method of claim 1, further comprising the step of coating the photochromic permeated plastic lens with a hard coating layer by chemical vapor deposition.

9. A photochromic permeated plastic lens, having a hard coating, manufactured by the method of claim 8.

10. A method of claim 1, further comprising the steps of forming a refraction gradient layer over the surface of the photochromic permeated lens using a chemical vapor deposition method and forming a hard coating layer over the refraction gradient layer using chemical vapor deposition.

11. A photochromic permeated plastic lens, having a refraction gradient layer and a hard coating layer, manufactured according to the method of claim 10.

12. A method of claim 8, wherein the hard coating layer is formed by a chemical vapor deposition method using a plasma and a Si containing organic compound gas and/or a Ti containing organic compound gas.

13. A method of claim 8, wherein the hard coating layer is formed by a chemical vapor deposition method using a plasma, oxygen and a Si containing organic compound gas.

14. A method of claim 10, wherein the refraction gradient layer is thicker than the hard coating layer.

15. A method of claim 8, wherein the index of refraction throughout the hard coating layer is essentially constant.

16. A method of claim 1, further comprising the step of coating the photochromic permeated plastic lens with a primer layer comprising a urethane based resin or a crosslinked polyvinyl acetal resin.

17. A photochromic permeated plastic lens, having a primer layer, manufactured by the method of claim 16.

18. A method of claim 16, wherein the primer layer is a urethane based resin comprising the reaction product of a polyisocyanate and an active hydrogen compound selected from an alkylene glycol group, polyalkylene glycol group, polyalkylene adipate group, polycaprolactone, polybutadiene glycol group, polyalkylene carbonate group and a silicone polyol group.

19. A method of claim 16, wherein the primer layer is a crosslinked polyvinyl acetal resin.

20. A method of claim 1, further comprising the step of coating a plastic lens with a primer layer, prior to vacuum depositing the photochromic material.

21. A method of claim 1, wherein the photochromic material is selected from a chromene group compound, a spirooxazine group compound, a spironaphthooxazine group compound, a spiropyran group compound, a naphthopyran group compound, a succinic anhydride group compound, a succinimide group compound, a viologen group compound, a triallylmethane group compound, a diallylethane group compound, and a diazo group compound.

22. A method of claim 1, wherein the photochromic material is vacuum deposited at a pressure of about $5 \times 10^{-5}$ torr or lower, and a temperature of between about 100–200° C.

23. A method of claim 1, wherein the photochromic material deposited on the lens is heated in the presence of air or a non-reactive gas.

24. A method of claim 23, wherein the heat processing is conducted at temperature between about 100–200° C. for about 0.5 hours.

25. A method of claim 1, wherein the vacuum deposition occurs in a vacuum chamber having a blocking plate placed between the lens and a photochromic material, and comprises the steps of moving the lens relative to the blocking plate while depositing the photochromic material such that a photochromic deposition gradient is formed.

26. A method of claim 1, wherein the vacuum deposition occurs in a vacuum chamber having a blocking plate placed between the lens and a photochromic material; and comprises the steps of moving the blocking plate relative to the lens while depositing the material such that a photochromic deposition gradient is formed.

27. A method of claim 1, wherein the plastic lens is formed by a reaction injection molding process comprising injecting into a mold a light curable resin having a light radical initiator and curing the resin.

28. A method of claim 1, wherein the plastic lens is formed by a reaction injection molding process comprising injecting into a mold a light and heat curable resin having a light radical initiator and a heat radical initiator, and curing the resin.

29. A method of claim 1, further comprising the step of coating the photochromic permeated plastic lens with a hard coating layer, the hard coating layer comprising a silicon compound of the general formula (VI) or its hydrolysis materials:

$$R^1{}_aR^2{}_bSi(OR^3)_{4-(a+b)} \tag{VI}$$

wherein $R^1$ is a saturated or unsaturated hydrocarbon having about 4–14 carbon atoms, $R^2$ is a hydrocarbon radical having about 1–6 carbon atoms or halogen hydrocarbons, $R^3$ is an alkyl, alkoxyalkyl, or acyl radical, and a and b are independently 0 or 1 such that a+b is 1 or 2.

30. A photochromic permeated plastic lens, having a hard coating layer, manufactured by the method of claim 29.

31. A method of manufacturing a photochromic lens comprising the steps of:

vacuum depositing a photochromic material onto a surface of a plastic lens lens at a pressure of about $5 \times 10^{-5}$ torr or lower to form a photochromic deposited lens, and heating the photochromic deposited lens at or near ambient pressure with air or a nonreactive gas for a time and at a temperature sufficient to allow the photochromic material to permeate the lens.

* * * * *